(12) United States Patent
McCreary et al.

(10) Patent No.: US 12,386,794 B2
(45) Date of Patent: Aug. 12, 2025

(54) PREDICTIVE RECOMMENDATIONS FOR SCHEMA MAPPING

(71) Applicant: Optum, Inc., Minnetonka, MN (US)

(72) Inventors: Daniel G. McCreary, St. Louis Park, MN (US); Joshua A. Meekhof, Grand Rapids, MI (US)

(73) Assignee: OPTUM, INC., Minnetonka, MN (US)

( * ) Notice: Subject to any disclaimer, the term of this patent is extended or adjusted under 35 U.S.C. 154(b) by 189 days.

(21) Appl. No.: 17/577,807

(22) Filed: Jan. 18, 2022

(65) Prior Publication Data

US 2023/0229639 A1 Jul. 20, 2023

(51) Int. Cl.
*G06F 16/21* (2019.01)
*G06N 20/00* (2019.01)

(52) U.S. Cl.
CPC .......... *G06F 16/211* (2019.01); *G06N 20/00* (2019.01)

(58) Field of Classification Search
CPC ............................. G06F 16/211; G06N 20/00
See application file for complete search history.

(56) References Cited

U.S. PATENT DOCUMENTS

| | | |
|---|---|---|
| 8,219,596 B2 | 7/2012 | Peukert |
| 8,386,493 B2 * | 2/2013 | Muni ................. G06F 16/214 707/740 |
| 8,719,299 B2 | 5/2014 | Voigt et al. |
| 2005/0060332 A1 * | 3/2005 | Bernstein ............. G06F 16/258 |
| 2006/0136428 A1 * | 6/2006 | Syeda-Mahmood ... G06F 16/25 |
| 2015/0269281 A1 * | 9/2015 | Moden ................ G06F 16/9538 707/694 |
| 2019/0286620 A1 * | 9/2019 | Al-Haimi .............. G06F 16/211 |
| 2019/0318272 A1 | 10/2019 | Sassin |

(Continued)

FOREIGN PATENT DOCUMENTS

| | | |
|---|---|---|
| WO | 2020/208163 A1 | 10/2020 |
| WO | 2021/091550 A1 | 5/2021 |

OTHER PUBLICATIONS

"OpenAI Codex," Open AI, Aug. 10, 2021, (4 pages), (Article, Online), [Retrieved from the Internet Aug. 4, 2022] <URL: https://openai.com/blog/openai-codex/>.

(Continued)

*Primary Examiner* — Hares Jami
(74) *Attorney, Agent, or Firm* — Alston & Bird LLP

(57) ABSTRACT

Various embodiments provide methods, apparatus, systems, computing entities, and/or the like, for recommending and/or defining cross-schema mappings, or a mapping from a data element type of a first schema to one of a second schema. In one example embodiment, a method is provided. The method includes identifying a plurality of canonical data element types belonging to a canonical schema and an external data element type belonging to an external schema. The method includes obtaining a multi-dimensional representation for each data element type and determining a predicted similarity score for each canonical data element type using comparison results from a mapper machine learning model. The method further includes generating a recommendation data object indicating one or more mappings between the external data element type and a selected subset of the plurality of canonical data element types, the subset selected according to predicted similarity score.

20 Claims, 9 Drawing Sheets

(56) References Cited

U.S. PATENT DOCUMENTS

| | | | |
|---|---|---|---|
| 2020/0081899 A1 | 3/2020 | Shapur et al. | |
| 2020/0097482 A1 | 3/2020 | Woodward et al. | |
| 2020/0364270 A1 | 11/2020 | Harpale | |
| 2021/0174219 A1 | 6/2021 | Gupta | |
| 2023/0023645 A1* | 1/2023 | Retinraj | G06N 3/042 |

OTHER PUBLICATIONS

"XML Schema Part 2: Datatypes Second Edition," W3C Recommendation, Oct. 28, 2004, (101 pages), [Retrieved from the Internet Apr. 8, 2022] <https://www.w3.org/TR/xmlschema-2/#built-in-datatypes>.

Chen, Mark et al. "Evaluating Large Language Models Trained On Code," arXiv PrePrint arXiv:2107.03374v2 [cs.LG] Jul. 14, 2021, (35 pages).

Ed-Douibi, Hamza. "20+ JavaScript Libraries To Draw Your Own Diagrams (2022 Edition)," MOdeling LAnguages, Feb. 23, 2022, (31 pages), [Retrieved from the Internet Apr. 8, 2022] <URL: https://modeling-languages.com/javascript-drawing-libraries-diagrams/>.

Hamilton, William L. et al. "Representation Learning on Graphs: Methods and Applications," arXiv PrePrint arXiv:1709.05584v3 [cs.SI], Apr. 10, 2018, (24 pages).

Rahm, Erhard et al. "A Survey Of Approaches To Automatic Schema Matching," The VLDB Journal, vol. 10, (Year: 2001), pp. 334-350, DOI: 10.1007/s007780100057.

Sahay, Tanvi et al. "Schema Matching Using Machine Learning," arXiv PrePrint arXiv:1911.11543v1 [cs.DB], Nov. 24, 2019, (7 pages).

Shraga, Roee et al. "ADnEV: Cross-Domain Schema Matching Using Deep Similarity Matrix Adjustment and Evaluation," Proceedings of the VLDB Endowment, May 1, 2020, vol. 13, No. 9, pp. 1401-1415.

Wikipedia Contributors, "Colossus: The Forbin Project," Wikipedia, The Free Encyclopedia, Mar. 24, 2022, (6 pages), [Retrieved from the Internet Apr. 8, 2022] <URL: https://en.wikipedia.org/wiki/Colossus:_The_Forbin_Project>.

\* cited by examiner

External Data Element Type 600

| | | | |
|---|---|---|---|
| 602 — | DataElementName | IndividualFirstName | |
| 606 — | DataElementUri | http://marklogic.com/metadata-registry/data-element/individual-first-name.xml | |
| | DataElementObjectClassCode | Individual | |
| | DataElementAbstractIndicator | false | |
| | DataElementPropertyTermName | First | |
| | DataElementRepresentationTerm | Name | |
| 604 — | DataElementDefinitionText | An Individual's First Name or Given Name | |
| | SubjectAreas | | |
| | | SubjectAreaCode | demographic |
| | DataStewards | | |
| | | PrimaryStewardId | admin |
| | | AlternateStewardId | dmccreary |
| | Approvals | | |
| | | Approval | ApprovalTypeCode |
| | | | ApprovdeByUserId |
| | | | ApprovalDateTime |
| | DataElementStatistics | | |
| | | xml-schema-type | xs:string |

FIG. 6

PREDICTIVE RECOMMENDATIONS FOR SCHEMA MAPPING

BACKGROUND

Various embodiments of the present disclosure address technical challenges related to mapping and/or matching data element types defined under different schemas, and in particular, recommending mappings between data element types that have the same or similar semantic meaning.

BRIEF SUMMARY

In general, embodiments of the present disclosure provide methods, apparatus, systems, computing devices, computing entities, and/or the like for recommending mappings between an external data element type and one or more canonical data element types that categorize data with substantially similar meaning as the external data element type. To be specific, the external data element type may be defined under an external schema that is different than a canonical schema under which the canonical data element types are defined. For instance, an external data element type labelled PersonGivenName and defined in accordance with an external schema may classify substantially similar data elements (e.g., bob, matt, james) as those classified by a canonical data element type labelled PatientFirstName and defined in accordance with a canonical schema; as a result, a mapping between the external data element type labelled PersonGivenName and the canonical data element labelled PatientFirstName may be recommended, in various embodiments.

Mappings and recommendations thereof between an external data element type and a canonical data element type enables improved and efficient integration of heterogenous data that may be obtained from external systems at a canonical system. That is, data obtained from an external system may be integrated in a consistent and structured manner using mappings from an external schema used by the external system to a canonical schema. Various embodiments improve accuracy of predicted mappings between external data element types and canonical data element types and provide effective recommendations for external-and-canonical-schema mapping, thereby reducing the number of repeated operations by end-users to integrate heterogeneous data elements to provide various technical improvements and advantages.

In accordance with one aspect, a computer-implemented method is provided. The computer-implemented method may include identifying a group of data element types including a plurality of canonical data element types and an external data element type. The plurality of canonical data element types are associated with a canonical schema, and the external data element type is associated with an external schema that is different from the canonical schema. The method may further include obtaining a multi-dimensional representation for each data element type. The method may further include determining a predicted similarity score for each canonical data element based at least in part on a comparison result between the multi-dimensional representation for the canonical data element type and the multi-dimensional representation for the external data element type using a mapper machine learning model. The method may further include generating, based at least in part on each predicted similarity score, a recommendation data object indicating one or more mappings between the external data element type and a selected subset of the plurality of canonical data element types. The method may further include performing one or more prediction-based actions based on the recommendation data object.

In accordance with another aspect, a computer program product is provided. The computer program product may include at least one computer-readable storage medium having computer-readable program code portions stored therein, the computer-readable program code portions including executable portions configured to cause at least one processor to identify a group of data element types including a plurality of canonical data element types and an external data element type. The plurality of canonical data element types are associated with a canonical schema, and the external data element type is associated with an external schema that is different from the canonical schema. The computer-readable program code portions may include executable portions further configured to cause at least one processor to obtain a multi-dimensional representation for each data element type. The computer-readable program code portions may include executable portions further configured to cause at least one processor to determine a predicted similarity score for each canonical data element based at least in part on a comparison result between the multi-dimensional representation for the canonical data element type and the multi-dimensional representation for the external data element type using a mapper machine learning model. The computer-readable program code portions may include executable portions further configured to cause at least one processor to generate, based at least in part on each predicted similarity score, a recommendation data object indicating one or more mappings between the external data element type and a selected subset of the plurality of canonical data element types. The computer-readable program code portions may include executable portions further configured to cause at least one processor to perform one or more prediction-based actions based on the recommendation data object.

In accordance with yet another aspect, an apparatus including a processor and at least one memory including computer program code is provided. The at least one memory and the computer program code may be configured to, with the processor, cause the apparatus to identify a group of data element types including a plurality of canonical data element types and an external data element type. The plurality of canonical data element types are associated with a canonical schema, and the external data element type is associated with an external schema that is different from the canonical schema. The at least one memory and the computer program code may be further configured to, with the processor, cause the apparatus to obtain a multi-dimensional representation for each data element type. The at least one memory and the computer program code may be configured to, with the processor, cause the apparatus to determine a predicted similarity score for each canonical data element based at least in part on a comparison result between the multi-dimensional representation for the canonical data element type and the multi-dimensional representation for the external data element type using a mapper machine learning model. The at least one memory and the computer program code may be configured to, with the processor, cause the apparatus to generate, based at least in part on each predicted similarity score, a recommendation data object indicating one or more mappings between the external data element type and a selected subset of the plurality of canonical data element types. The at least one memory and the computer program code may be configured to, with the processor, cause the apparatus to perform one or more prediction-based actions based on the recommendation data object.

BRIEF DESCRIPTION OF THE DRAWINGS

Having thus described the invention in general terms, reference will now be made to the accompanying drawings, which are not necessarily drawn to scale.

Figure 1:
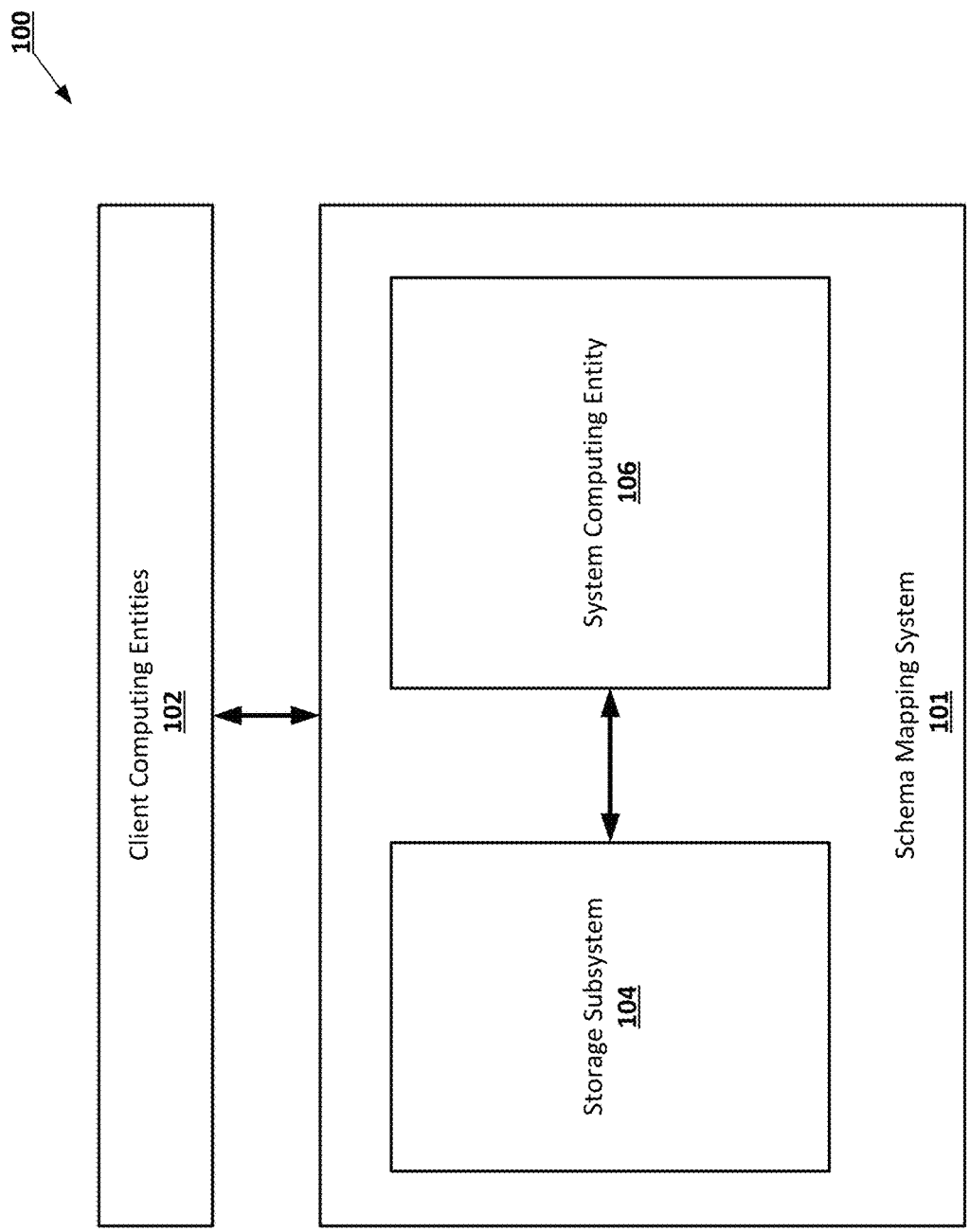

FIG. 1 provides an exemplary overview of an architecture that may be used to practice embodiments of the present disclosure.

Figure 2:
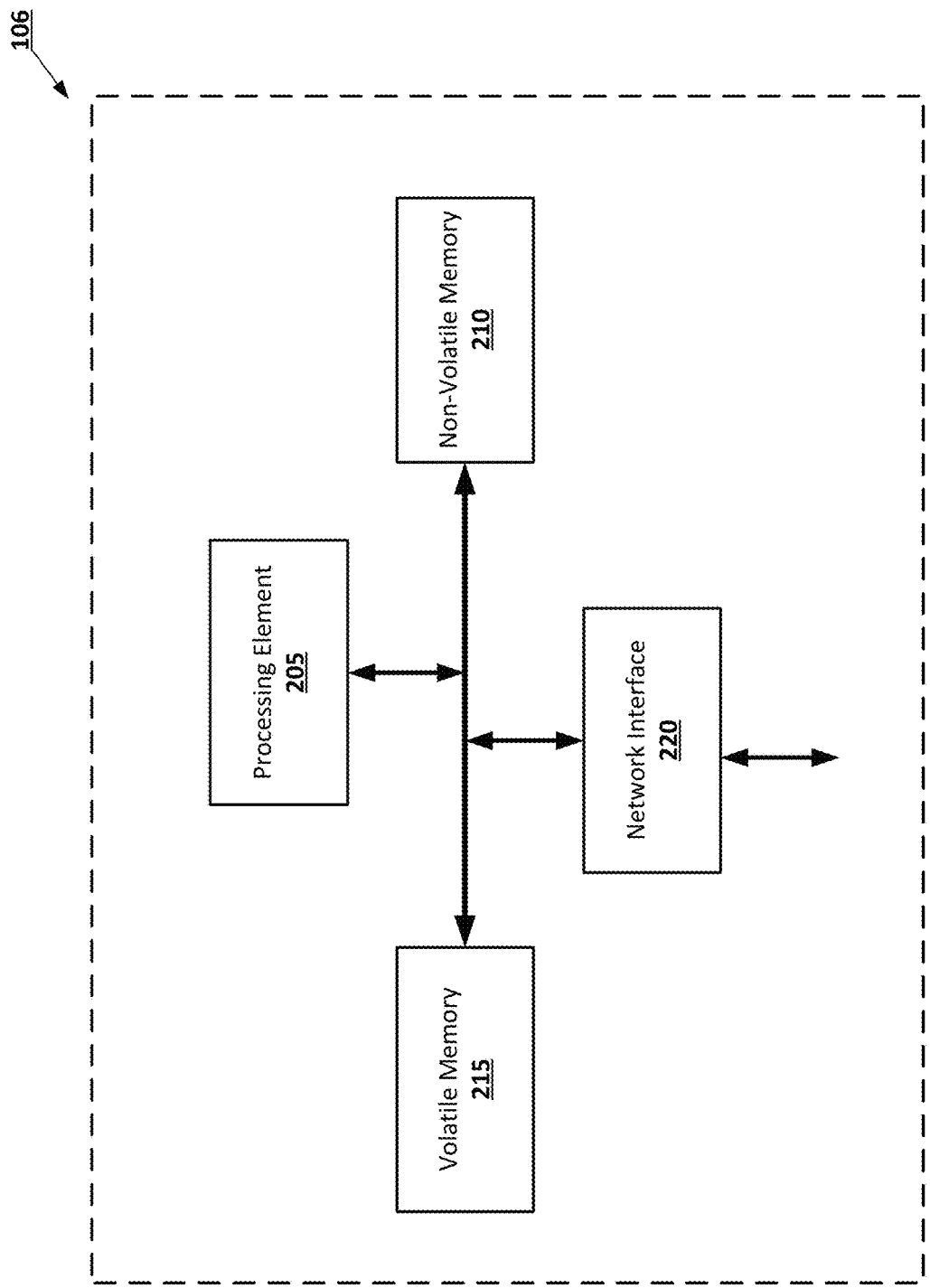

FIG. 2 provides a diagram of an example system computing entity, in accordance with some embodiments discussed herein.

Figure 3:
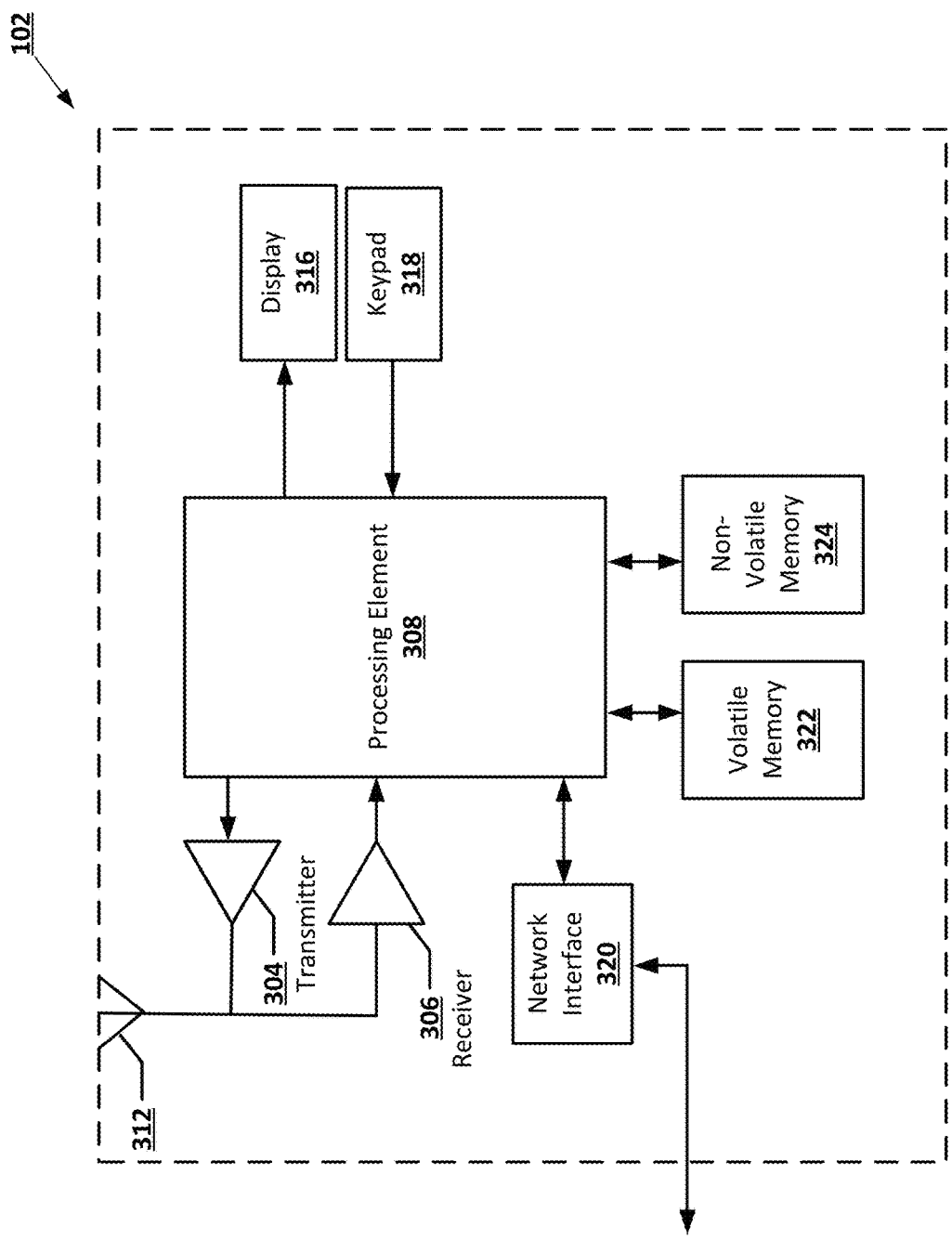

FIG. 3 provides a diagram of an example client computing entity, in accordance with some embodiments discussed herein.

Figure 4:
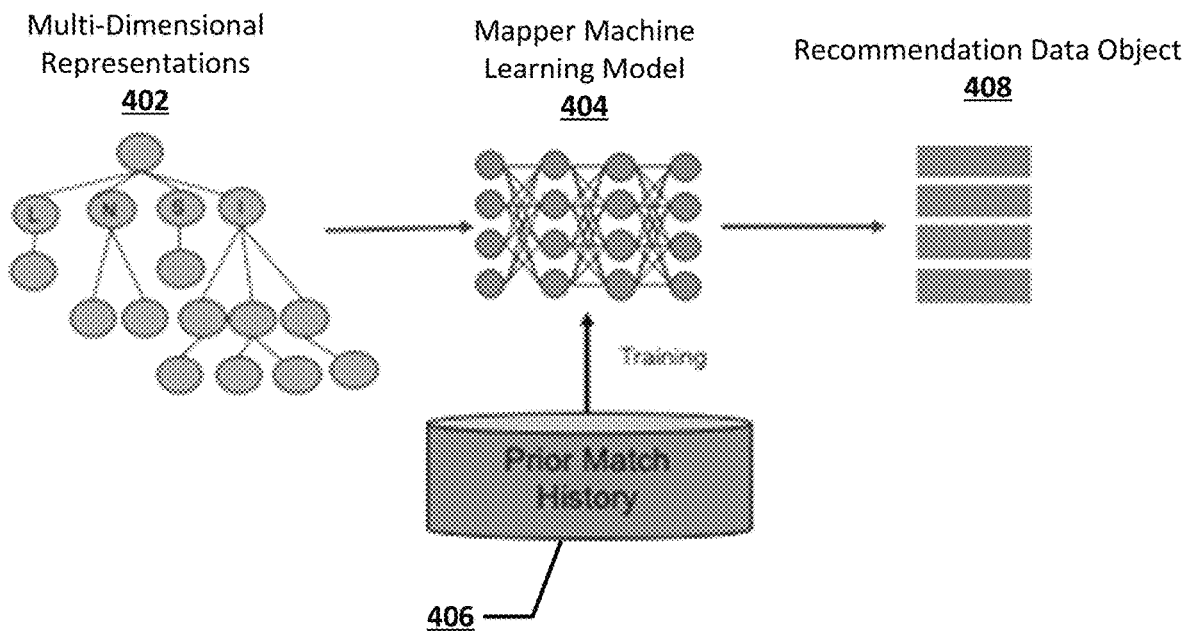

FIG. 4 provides a diagram illustrated an example overview of recommendation of mappings between an external data element type of an external schema and canonical data element types of a canonical schema, in accordance with various embodiments of the present disclosure.

Figure 5:
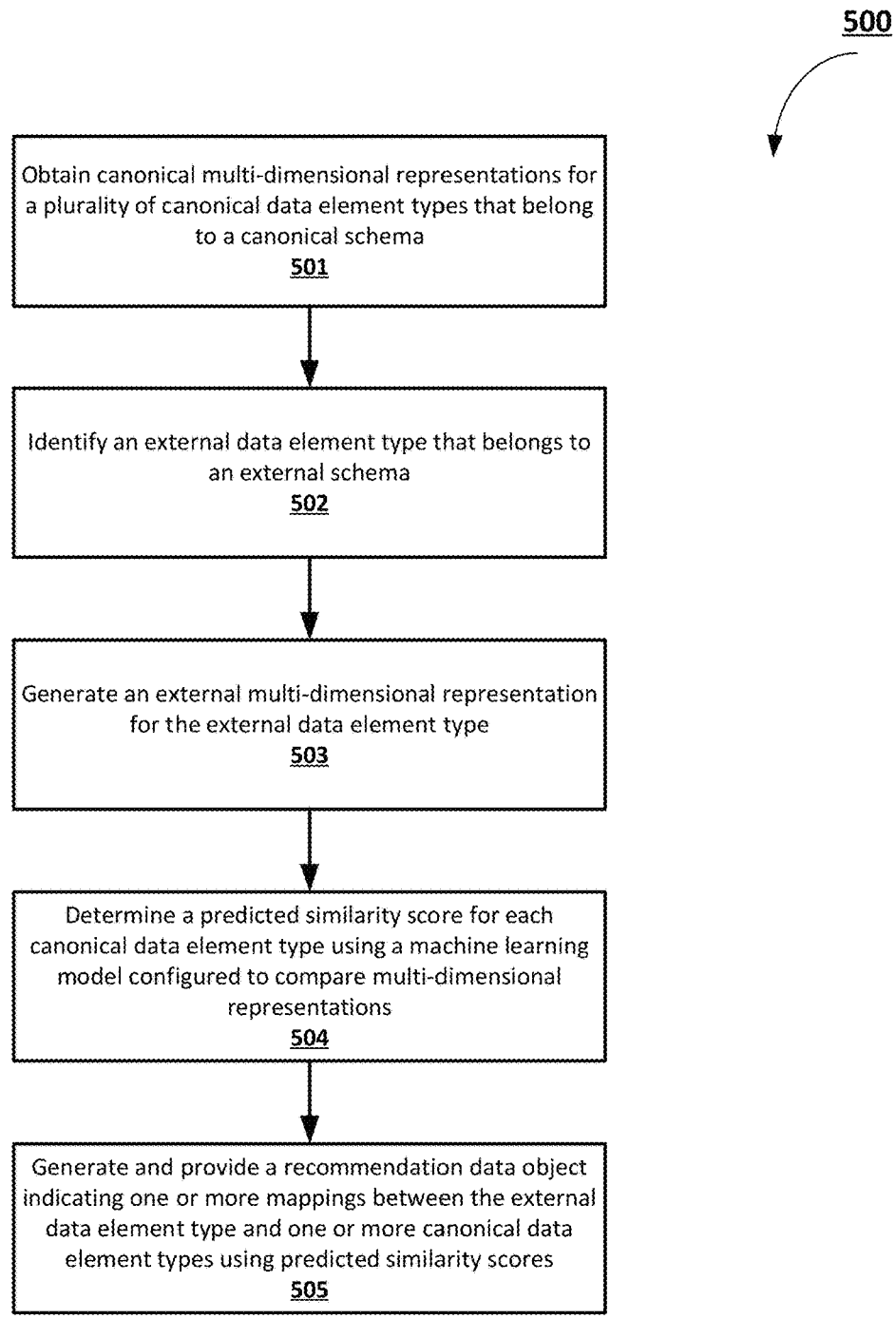

FIG. 5 illustrates a flowchart diagram of an example process for recommending mappings between an external data element type of an external schema and canonical data element types of a canonical schema, in accordance with some embodiments discussed herein.

FIG. 6 illustrates example metadata associated with an example data element type, in accordance with some embodiments discussed herein.

Figure 7:
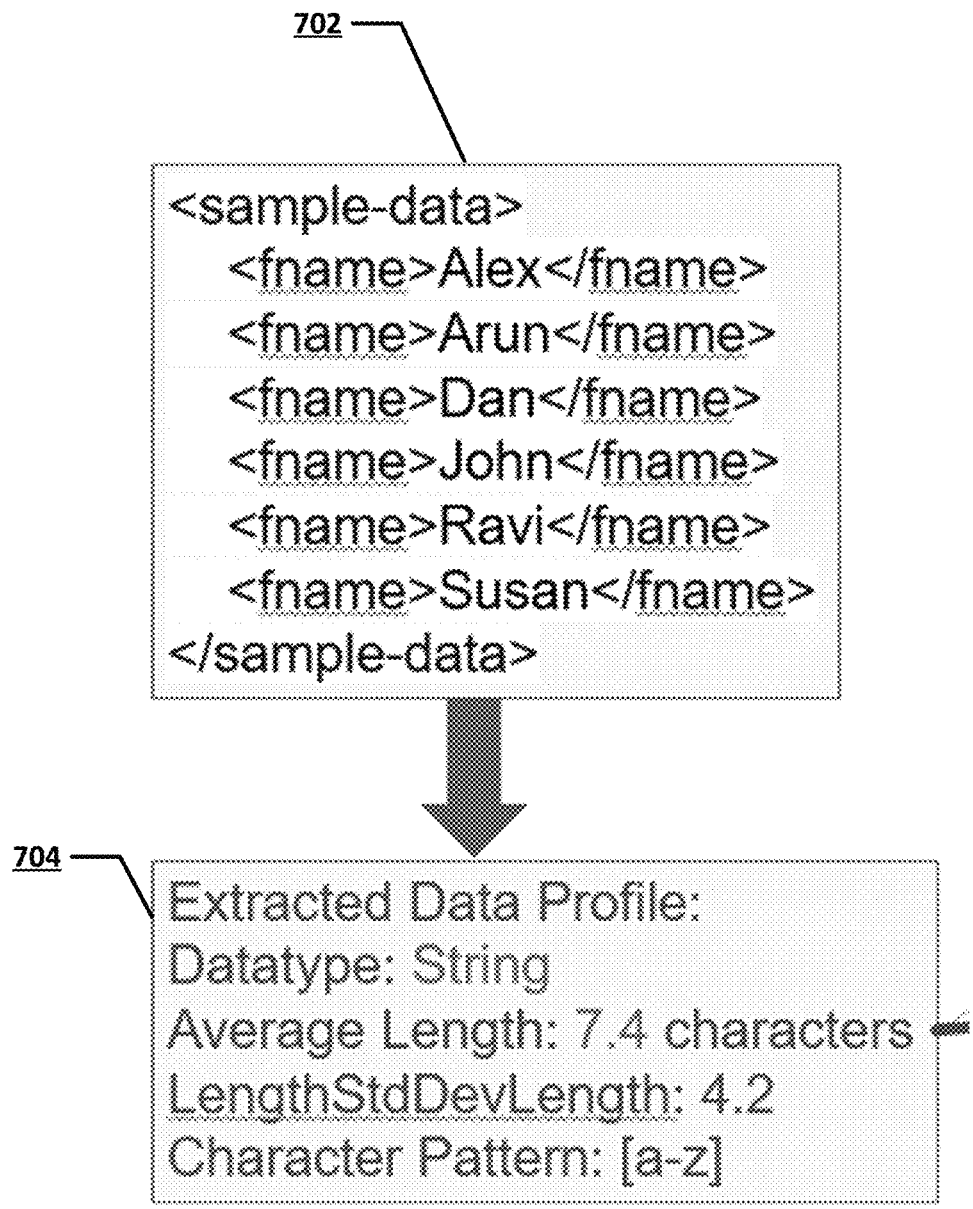

FIG. 7 illustrates an example statistical profile generated for an example data element type, in accordance with some embodiments discussed herein.

Figure 8:
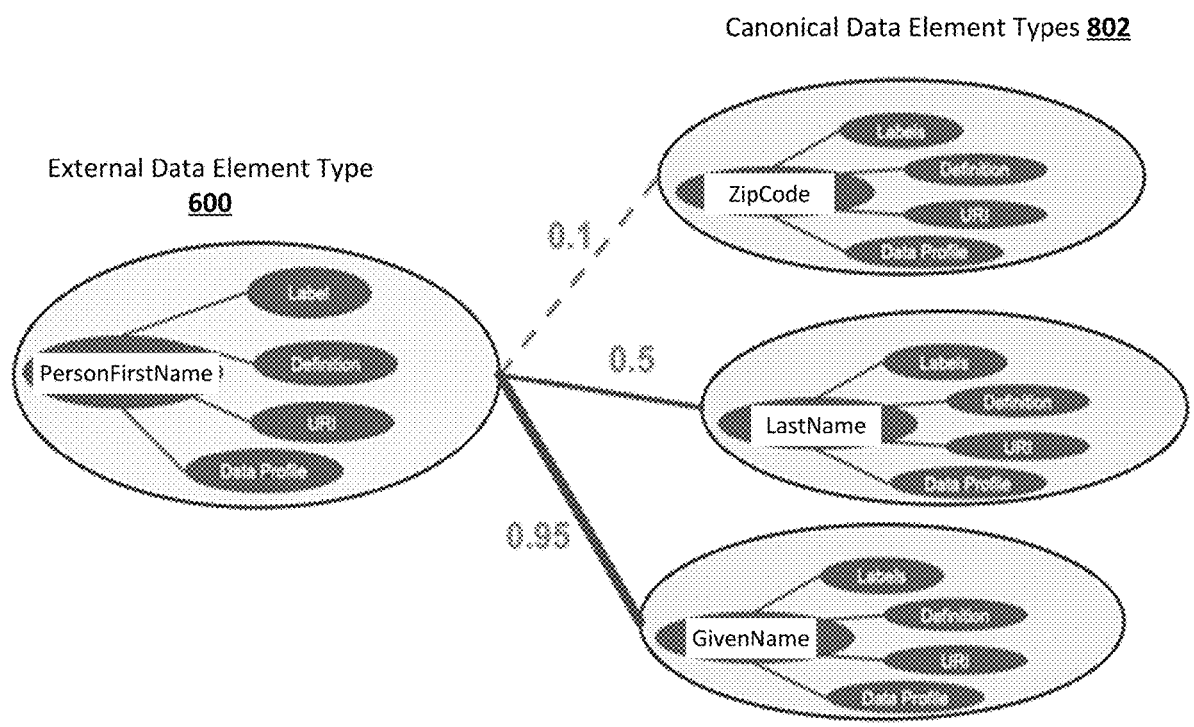

FIG. 8 provides a diagram illustrating use of predicted similarity scores in recommending mappings between an external data element type and canonical data element types, in accordance with some embodiments discussed herein.

Figure 9:
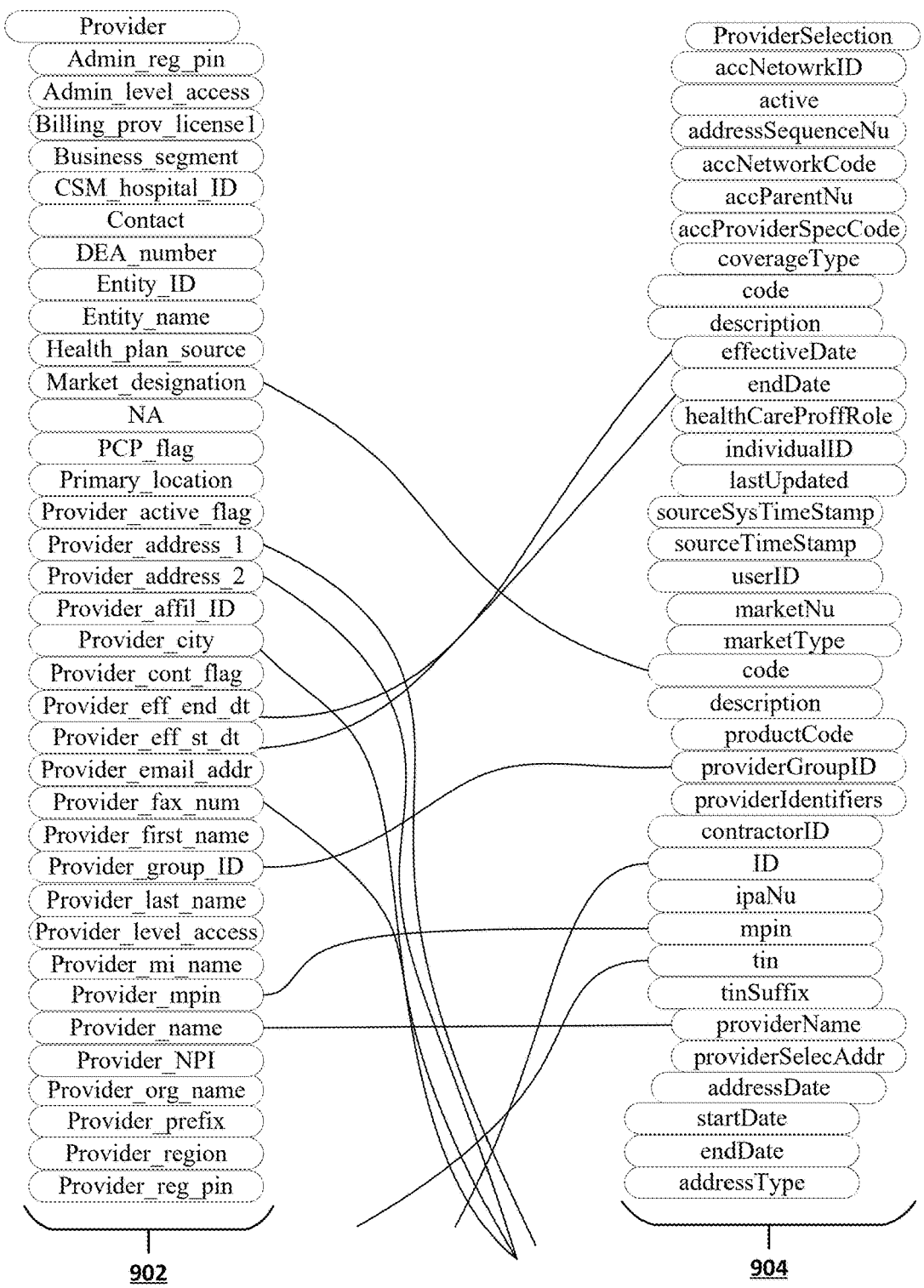

FIG. 9 illustrates an example graphical user interface for recommending mappings between external data element types and canonical data element types, in accordance with some embodiments discussed herein.

DETAILED DESCRIPTION

Various embodiments of the present disclosure now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to providing text-based summarizations of conversations, one of ordinary skill in the art will recognize that the disclosed concepts can be used in other summarization and/or text extraction applications.

I. Overview and Technical Improvements

Various embodiments of the present disclosure are generally directed to evaluating similarities between different data element types and recommending mappings between data element types that are similar. In various embodiments, an external data element type and a canonical data element type are evaluated, and if the canonical data element type classifies, encodes, categorizes, and/or the like data elements with a substantially similar meaning as the external data element type, then a mapping between the external data element type and the canonical data element type may be recommended. Thus, the recommended mapping may suggest that data elements associated with the external data element type may also be accurately associated with the canonical data element type. Accordingly, by recommending and/or defining mappings from external data element types to canonical data element types, various embodiments enable efficient integration of external data that is structured according to an external schema into a canonical system in which the external data may be re-structured according to a canonical schema using the recommended and/or defined mappings.

In various embodiments, similarities between an external data element type and various canonical data element types are determined in order to provide accurate and effective recommendations of cross-schema mappings. In particular, this determination or evaluation is performed through obtaining multi-dimensional representations for the external and canonical data element types to enable deep comparisons of the same in multiple dimensions. In some example embodiments, the multi-dimensional representations for data element types may be structured or defined, for example as a graph-based data structure, such that a comparison of two multi-dimensional representations can be efficiently performed. In various embodiments, a machine learning model is configured and used to compare at least two multi-dimensional representations—for example, a first multi-dimensional representation for a canonical data element type and a second multi-dimensional representation for an external data element type—and to output a predicted similarity score between the canonical data element type and the external data element type. Thus, using the machine learning model and the predicted similarity scores, predicted mappings between canonical data element types and an external data element type may be recommended.

With respect to recommendation of cross-schema mappings (e.g., a mapping between an external data element type and a canonical data element type), various embodiments may implement a graphical user interface (GUI) for providing or displaying recommendations of cross-schema mappings to an end-user. In various embodiments, the GUI may visually indicate a plurality of external data element types belonging to an external schema and a plurality of canonical data element types belonging to a canonical schema, and the GUI may further visually indicate one or more recommended mappings of a particular external data element type with one or more recommended canonical data element types. In various embodiments, the GUI may be further configured to receive user-selected cross-schema mappings; for example, an end-user may use the GUI to explicitly define a user-selected cross-schema mapping between the particular external data element and a particular canonical data element types (which may be a recommended canonical data element type, in some example instances). Based at least in part on user-selected cross-schema mappings, the machine learning model configured and used in determining the mapping recommendations may be re-configured, in some example embodiments.

Therefore, various embodiments enable improved and efficient cross-schema mapping and by extension, efficient data integration and communication between different, independent, and heterogenous systems. In particular, various embodiments enable at least semi-automation of cross-schema mapping, thereby precluding manual efforts which may involve manual comparison of an external data element type with at least thousands of canonical data element types of a canonical schema.

Various embodiments improve accuracy of predicted mappings between external data element types and canonical data element types and provide effective recommendations for external-and-canonical-schema mapping, thereby reducing the number of repeated operations by end-users to integrate heterogeneous data to provide various technical improvements and advantages. Specifically, various embodiments address technical challenges related to computational efficiency, operational reliability, operational throughput, and communication bandwidth of schema mapping systems and/or data integration systems.

In one example, reducing the number of repeated operations by end-users to map external data element types to canonical data element types and to integrate heterogenous data in turn decreases the number of computational operations performed by schema mapping systems and/or data integration systems and decreases the amount of computational resources used by said systems to thereby improve overall computational efficiency. As a further technical effect, the overall number of end-users (e.g., tasked with mapping data element types and integrating heterogenous data) that a schema mapping and/or data integration system can serve may be increased; that is, operational throughput is improved. Similarly, the overall number of end-users, computational resources, and time needed to perform a fixed number of schema mapping and data integration tasks is reduced by way of accurate mapping recommendations provided in various embodiments. Accordingly, various embodiments of the present disclosure make important technical contributions to the field of cross-schema mapping and/or data integration by at least improving computational efficiency and operational throughput of schema mapping systems and/or data integration systems.

II. Exemplary Definitions of Certain Terms

The term "data element type" may refer to a data entity configured to describe one or more characteristics, a context, a meaning and/or the like of a data element, data value, data object, data structure, and/or the like. In some examples, a data element type may be an attribute of a data element. Multiple data elements associated with the data element type (e.g., having the data element type as an attribute) may have common characteristic or meanings described by the data element type. Thus, a data element type may classify, encode, and/or categorize data elements. As a non-limiting illustrative example, a data element bob that is associated with a data element type labelled PersonGivenName may be understood as having meaning of a person's given name. Otherwise, with another data element type or without any data element type, the data element bob could be understood as a person's last name, a street name, an acronym, or some incongruous data, for example. That is, a data element type of a data element may serve as an indication to a system, computing entity, and/or the like of how to process the data element, and/or similarly as an indication to an end-user of how to interpret or understand the data element. As additional non-limiting illustrative examples, data element types of int, byte, char, float, boolean, and/or the like describe characteristics (e.g., size, number of bits) as well as meaning of data elements, and such data element types can be used to instruct a system or computing entity on how to process (e.g., write, store, manipulate) data elements. In various examples, data elements may be classified by data element types that belong to a particular schema.

The term "schema" may describe an organization, an ontology, a taxonomy, and/or the like of data element types in describing or prescribing meaning to a universe of data. In some examples, a schema may be hierarchical in nature. For example, some data element types may describe data elements that belong to or be otherwise associated with another data element described by a different data element type, thus those data element types may accordingly belong to or be otherwise associated with the different data element type. Different schemas may include different data element types for describing the same universe of data. As one non-limiting illustrative example, a programming language may be understood as a schema, in two different programming languages, a byte data element type and a char data element type may similarly describe and classify data elements with the size of eight bits. In another non-limiting example, a first schema may include a PatientFirstName data element type, a PatientLastName data element type, and a DateofBirth data element type, while a second schema may include a PersonGivenName data element type, a PersonFamilyName data element type, and a BirthDate data element type. The first schema and the second schema may each describe or be used to classify similar data (e.g., data relating to personal information); however, in various existing data integration systems, a data element classified by a data element type of the first schema may not be automatically translated or mapped to a data element type of the second schema. That is, for example, it may be unclear and difficult to automatically determine what data element type of the second schema to include as an attribute of the data element classified by a data element type of the first schema. In various existing systems and methods, an end-user may need to manually map or translate the data element to a data element type of the second schema, thus costing excess time and computational resources. Various embodiments of the present disclosure provide for improved, accurate, and efficient mapping of data element types of a first schema to data element types of a second schema, which may at least in part enable automatic or semi-automatic data integration.

The term "canonical" as used, for example, in "canonical data element type," "canonical schema," or "canonical system" may describe concepts and entities in relation to a system embodying various embodiments described herein. In various embodiments, different or external data may be received at a canonical system for integration at the canonical system, and various embodiments may enable at least in part integration of the different or external data in accordance with a canonical schema (and canonical data element types thereof) used by the canonical system. That is, the term "canonical" may represent a perspective or frame of reference with respect to having a schema to which external data is mapped and integrated.

The term "external" as used, for example, in "external data element type," "external schema," or "external system" may describe concepts and entities from an opposite perspective or frame of reference as "canonical" concepts and entities. For instance, data elements categorized according to an external schema and that may be generated and/or managed by an external system may be provided to a canonical system and integrated, in accordance with various embodiments described herein, according to a canonical schema. In some example non-limiting scenarios, external data encoded using external schemas by a plurality of external systems may all be mapped and/or integrated into a canonical schema at a canonical system. That is, in some examples, a canonical system and a canonical schema may be centralized in concepts described in various example embodiments. It may be appreciated that a first system may be a canonical system and a second system may be an external system in example instances in which data generated and/or managed by the second system is mapped and/or integrated to the first system and schema thereof, and the same first system may be an external system to the second system being a canonical system in example instances in which data generated and/or managed by the first system is mapped and/or integrated to the second system and schema thereof. That is, "canonical" and "external" may refer to relative perspectives.

The term "multi-dimensional representation" may refer to a data entity that is configured to generally describe aspects of a data element type. A multi-dimensional representation may correspond to and be associated with a data element type, and in various embodiments, a multi-dimensional representation may be obtained and/or generated for canonical data element types and external data element types. Generally, a multi-dimensional representation may describe consistent aspects of different data element types (e.g., canonical data element types, external data element types) such that different data element types may be directly compared. In this regard, multi-dimensional representations may be schema-agnostic and/or enable schema-agnostic comparison of data element types. In various embodiments, a multi-dimensional representation of a data element type is, comprises, is embodied by, and/or the like a graph-based data structure, and the graph-based data structure includes subgraph portions each corresponding to a dimension or aspect of the data element type. Each subgraph portion may include various nodes and edges to individually describe various aspects of the data element type. In various embodiments, a multi-dimensional representation is a vector, an array, a matrix, a data structure, embeddings, and/or the like. A multi-dimensional representation of a data element type may be configured to describe a data element type with respect to a schema-specific identifier of the data element type, a linguistic definition string of the data element type, a schema-agnostic identifier of the data element type, and a statistical profile data object of the data element type.

The term "schema-specific identifier" may refer to a data entity configured to uniquely identify a data element type. That is, a given data element type may be uniquely identified by a schema-specific identifier within a schema, and the schema-specific identifier may be understood as metadata for the given data element type. In some examples, a schema-specific identifier of a data element type is an alphanumeric or alphabetical label, name, and/or the like. For instance, PersonGivenName and PatientFirstName may individually be schema-specific identifiers (e.g., labels, names) for data element types of different schemas. As another non-limiting example, byte and char or boolean and flag may individually be schema-specific identifiers for data element types of different schemas. It may be appreciated that a schema-specific identifier of a data element type may be a mechanism by which the data element type indicates to a system or computing entity how to process data elements of the data element type. For example, a system or computing entity may parse the schema-specific identifier of a data element type as an attribute of a data element in order to identify the data element type of the data element. Similarly, a schema-specific identifier of a data element type may be a mechanism by which an end-user may understand the encoding or classification of data elements by the data element type. A schema-specific identifier may be a value, a string, a vector, an array, a matrix, a data object, a data structure, embeddings, and/or the like. A schema-specific identifier of a data element type may be defined by the entity responsible for the schema to which the data element type belongs. For example, an entity (e.g., a custodian, an administrator) managing the schema may explicitly name or label various data element types with corresponding schema-specific identifiers. In various embodiments, a schema registry database may store schema-specific identifiers for data element types of a schema. A schema-specific identifier of a data element type may be defined according to standardized formats, naming conventions, and/or the like. For example, a schema-specific identifier of a data element type may comply with the International Organization for Standardization (ISO) International Electrotechnical Commission (IEC) 11179 naming convention or standard requiring that a schema-specific identifier should at least include a namespace prefix, an object or entity class, a property term name, and a representation term or type. A non-limiting illustrative example of a schema-specific identifier that is compliant with ISO IEC 11179 may be u:PersonGenderCode in which u describes a namespace (e.g., a first hierarchical domain of the data element type), Person describes an object or entity class (e.g., a second hierarchical domain of the data element type), Gender describes a property term name, and Code describes a representation term or type. Some example schema-specific identifier may be compliant with at least portions of various standards or conventions.

The term "linguistic definition string" may refer to a data entity configured to describe and linguistically explain the encoding or classification of data elements by a data element type, and/or linguistically explain common characteristics across data elements associated with the data element type. That is, a given data element type may be associated with a linguistic definition string describing characteristics of data elements classified, encoded, and/or categorized by the given data element type and explaining why data elements may have the given data element type as an attribute. A linguistic definition string may be understood as metadata for a data element type. A linguistic definition string of a data element type may be defined by the entity responsible for the schema to which the data element type belongs. For example, an entity (e.g., a custodian, an administrator) managing the schema may record linguistic explanations of data element types of the schema. In various embodiments, a schema registry database may store linguistic explanations that are associated with data element types of a schema.

The term "schema-agnostic identifier" may refer to a data entity configured to serve as a standardized reference or a universal identifier. In some example embodiments, a schema-agnostic identifier for a data element type is a Universal Resource Identifier (URI). A schema-agnostic identifier may be a reference or link to existing data element types or a resource describing an existing data element type, and multiple schema-agnostic identifiers for multiple data element types may reference the same resource or existing data element type, thereby heavily suggesting that the multiple data element types are substantially similar (e.g., may each be used to encode or classify the same data elements). A schema-agnostic identifier may be understood as metadata for a data element type. A schema-agnostic identifier of a data element type may be defined by the entity responsible for the schema to which the data element type belongs, and the entity (e.g., a custodian, an administrator) may have knowledge of a universal resource outside of the schema or knowledge of other data element types of other schemas in order to define the schema-agnostic identifier. In various embodiments, schema-agnostic identifiers for data element types of a schema may be stored in a schema registry database.

The term "statistical profile data object" may refer to a data entity configured to describe statistical measures across data elements associated with a data element type. That is, a given data element type may be associated with a statistical profile data object describing statistical measures across a plurality of data elements that are classified, encoded, categorized, and/or the like by the given data element type. Thus, a statistical profile data object may be understood as metadata for a data element type. In various embodiments, the statistical measures described by a statistical profile data object for a data element type may include average length or size of the data elements, standard deviation of length or size, value distributions, an average data element (e.g., for numeric data elements), and/or the like. In some example instances, determining the statistical measures described by a statistical profile data object may involve normalization of data elements.

The term "mapper machine learning model" may refer to a data entity configured and used to compare multi-dimensional representations of data element types and to output predicted similarity scores describing the comparisons. The mapper machine learning model may include and/or may be implemented as a deep-learning neural network machine learning model, an artificial neural network machine learning model, and/or the like. Determination and output of a predicted similarity score by a mapper machine learning model may be trained in a supervised manner using user-selected cross-schema mappings, or mappings that may have been historically and explicitly defined by an end-user. A mapper machine learning model may be trained and re-trained as additional user-selected cross-schema mappings are defined.

The term "recommendation data object" may refer to a data entity configured to describe one or more recommended canonical data element types that are predicted to accurately map with an external data element type. That is, the recommendation data object may identify one or more recommended mappings between an external data element type and one or more canonical data element types. In various embodiments, the recommended mappings identified by the recommendation data object are selected using predicted similarity scores output by a mapper machine learning model. In some examples, a recommendation data object may identify the one or more recommended canonical data element types using the schema-specific identifiers (e.g., labels, names) of each recommended canonical data element type. A recommendation data object may be a vector, an array, a matrix, a data structure, embeddings, and/or the like.

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example system architecture 100 for recommending mappings between data element types belonging to a first schema and data element types belonging to a second schema. In this regard, the system architecture 100 may be configured to integrate data organized according to an external schema (e.g., generated and managed by an external system) into a canonical schema at a canonical system. The system architecture 100 may be used at least to obtain multi-dimensional representations for different data element types to describe consistent aspects and features of each data element type, to determine predicted similarity scores between an external data element type and various canonical data element types using a mapper machine learning model, and to provide and/or indicate a recommendation of mapping the data element types to select canonical data element types using the predicted similarity scores. Generally, the system architecture 100 enables the identification of canonical data element types that are predicted to accurately classify, encode, categorize, and/or the like data elements that have been or may be classified, encoded, categorized, and/or the like by a given external data element type.

The system architecture 100 includes a schema mapping system 101 configured to identify and recommend mappings between external data element types and canonical data element types, such as by at least generating multi-dimensional representations for the data element types and comparing the multi-dimensional representations using a mapper machine learning model. In some examples, the schema mapping system 101 may be a canonical system, or a system associated with a canonical schema, at which external data (e.g., data elements classified according to an external schema) is and/or will be integrated—with differences in the external schema and the canonical schema necessitating cross-schema mapping in order to accurately integrate and process the external data. Alternatively, the schema mapping system 101 may be an external system managing or otherwise associated with external data and having knowledge of a canonical schema of a canonical system at which the external data is and/or will be integrated, and the external system as the schema mapping system 101 may recommend and/or define cross-schema mappings to assist in the integration of the external data at the canonical system. In a further alternative example, the schema mapping system 101 may be a third-party system overseeing data integration and accordingly identifying and recommending cross-schema mappings. In yet another alternative example, the schema mapping system 101 may be a system configured to identifying and recommend mappings between external data and canonical data stored by the schema mapping system 101 (e.g., translating or assisting in translating of computer program code from a first programming language schema to a second programming language schema).

In various embodiments, the schema mapping system 101 is configured to obtain multi-dimensional representations for external data element types and canonical data element types in order to consistently and fairly compare external data element types and canonical data element types across multiple dimensions or aspects. In some examples, the schema mapping system 101 may receive external data and/or external schema registry information (e.g., schema-specific identifiers of external data element types, linguistic definition strings of external data element types, schema-agnostic identifiers of external data element types, statistical profile data objects of external data element types, and/or the like) from one or more client computing entities 102. For example, a client computing entity 102 may be an external system. In some embodiments, the schema mapping system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). In various embodiments, the schema mapping system 101 comprises an application programming interface (API) through which API queries identifying a particular external data element type may be received and through which recommended mappings for the particular external data element type may be provided in API responses.

The schema mapping system 101 may include a system computing entity 106 and a storage subsystem 104. The system computing entity 106 may be configured to perform various operations described herein to obtain multi-dimensional representations of data element types, to operate a mapper machine learning model to determine predicted similarity scores for canonical data element types with respect to a given external data element type, and to recommend and/or define mappings between the given external data element type and one or more canonical data element types. In some example embodiments, the system computing entity 106 may be configured to automatically use recommended, defined, and/or user-selected cross-schema mappings to integrate external data in accordance with a canonical schema. In various embodiments, the system computing entity 106 is configured to retrieve information (e.g., from a schema registry database) describing metadata for a schema, such as an external schema and/or a canonical schema, which may be used in generating multi-dimensional representations for data element types of the schema.

In various embodiments, the system computing entity 106 may be a cloud-based computing system and comprises one or more computing devices each configured to share and allocate computer processing resources and data in order to recommend and/or define cross-schema mappings, in some examples. In other example embodiments, the system computing entity 106 may be an on-premise computing device, a single computing device, one or more interconnected computing devices working together, a distributed computing system, one or more devices in an edge computing architecture, and/or the like.

The storage subsystem 104 may be configured to store certain data for recommending and/or defining cross-schema mappings, or mappings from an external data element type of an external schema to one or more canonical data element types of a canonical schema. For instance, in example embodiments, the storage subsystem 104 stores multi-dimensional representations for canonical data element types and/or external data element types. As another non-limiting example, the storage subsystem 104 is and/or comprises one or more schema registry databases each describing metadata for a schema such as schema-specific identifiers, linguistic definition strings, schema-agnostic identifiers, statistical profile data objects, and/or the like. In some examples, the storage subsystem 104 stores sample data elements associated with each data element type such that a statistical profile data object may be generated (e.g., by the system computing entity 106).

The storage subsystem 104 may include one or more storage units, such as multiple distributed storage units that are connected through a computer network. Each storage unit in the storage subsystem 104 may store at least one of one or more data assets and/or one or more data about the computed properties of one or more data assets. Moreover, each storage unit in the storage subsystem 104 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Computing Entities

In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/ or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

FIG. 2 provides a schematic of a system computing entity 106, according to one embodiment of the present disclosure. As shown in FIG. 2, in one embodiment, the system computing entity 106 may include, or be in communication with, one or more processing elements 205 (also referred to as processors, processing circuitry, and/or similar terms used herein interchangeably) that communicate with other elements within the system computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the system computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media 210 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the system computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the system computing entity 106 with the assistance of the processing element 205 and operating system.

As indicated, in one embodiment, the system computing entity 106 may also include one or more network interfaces 220 for communicating with various computing entities (e.g., one or more other system computing entities 106, one or more client computing entities 102), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the system computing entity 106 may include, or be in communication with, one or more input elements, such as a keyboard input, a mouse input, a touch screen/display input, motion input, movement input, audio input, pointing device input, joystick input, keypad input, and/or the like. The system computing entity 106 may also include, or be in communication with, one or more output elements (not shown), such as audio output, video output, screen/display output, motion output, movement output, and/or the like.

FIG. 3 provides a schematic of an example client computing entity 102 that may be used in conjunction with embodiments of the present disclosure. Client computing entities 102 can be operated by various parties, and the system architecture 100 may include one or more client computing entities 102. Within the system architecture 100, client computing entities 102 may be and/or may be components of external systems that manage data in accordance with external schemas, and the client computing entities 102 may be configured to at least assist (e.g., by providing relevant information regarding an external schema) in recommendation or definition of cross-schema mappings such that the data managed by the external systems can be integrated in accordance with a canonical schema.

As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the system computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the system computing entity 106 via a network interface 320.

Via these communication standards and protocols, the client computing entity 102 can communicate with various other entities (e.g., system computing entities 106, storage subsystem 104) using concepts such as Unstructured Supplementary Service Data (USSD), Short Message Service (SMS), Multimedia Messaging Service (MMS), Dual- Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like.

Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the system computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the system computing entity 106, various other computing entities, and/or a storage subsystem 104.

In another embodiment, the client computing entity 102 may include one or more components or functionality that are the same or similar to those of the system computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described, various embodiments enable improved and efficient cross-schema mapping and by extension, efficient data integration and communication between different, independent, and heterogenous systems. Various embodiments improve accuracy of predicted mappings between external data element types and canonical data element types and provide effective recommendations for external-and-canonical-schema mapping, thereby reducing the number of repeated operations by end-users to integrate heterogeneous data to provide various technical improvements and advantages. Specifically, various embodiments address technical challenges related to computational efficiency, operational reliability, operational throughput, and communication bandwidth of schema mapping systems and/or data integration systems. That is, various technical advantages provided in various embodiments described herein include decreased number of computational operations performing by schema mapping systems and/or data integration systems and increased operational throughput and capacity. Accordingly, various embodiments of the present disclosure make important technical contributions to the field of cross-schema mapping and/or data integration.

FIG. 4 provides a diagram illustrating an example overview or operational flow of recommendation or definition of cross-schema mappings in accordance with various embodiments described herein. As previously described and presently illustrated in FIG. 4, multi-dimensional representations 402 may be used to represent or characterize multiple aspects of data element types, including canonical data element types and external data element types. Such aspects or dimensions described by multi-dimensional representations 402 may be consistent in multi-dimensional representations 402 for canonical data element types and multi-dimensional representations 402 for external data element types. In the illustrated embodiments, the multi-dimensional representations 402 characterize four dimensions or aspects of data element types, and the multi-dimensional representations 402 are graph-based data structure with subgraph portions each corresponding to a dimension or aspect of data element types.

The diagram of FIG. 4 illustrates multi-dimensional representations 402 being provided to a mapper machine learning model 404 for comparison. In particular, at least one multi-dimensional representation 402 for an external data element type and multi-dimensional representations 402 for a plurality of canonical data element types may be provided to the mapper machine learning model 404 in order to determine, recommend, and/or define mappings from the external data element type to one or more canonical data element types. In some examples, multi-dimensional representations 402 may be provided to the mapper machine learning model 404 in pairs that include the multi-dimensional representation 402 for the external data element type and a multi-dimensional representation 402 for a canonical data element type.

In various embodiments, the mapper machine learning model 404 is a deep learning neural network (DNN) machine learning model configured (e.g., trained) and used to compare multi-dimensional representations 402 for data element types. In particular, the mapper machine learning model 404 may compare the multi-dimensional representations 402 on a dimensional basis, or by individual dimensions, and may weight each dimension or the results of the comparison in each dimension by configurable dimensional weights. In various embodiments, the mapper machine learning model 404, and in particular the dimensional weights, are configured during training of the mapper machine learning model 404 in order to accurate evaluate similarity between multi-dimensional representations 402. In some examples, the dimensional weights are implemented as an attention mechanism with respect to the different dimensions captured by the multi-dimensional representations 402.

As shown in FIG. 4, the mapper machine learning model 404 may be trained according to prior match history, or a plurality of user-selected cross-schema mappings 406. For instance, the mapper machine learning model 404 is trained in a supervised manner with user-selected cross-schema mappings 406 describing a true, target, or desired output for a given external data element type, and the dimensional weights and/or the mapper machine learning model 404 may be reconfigured based at least in part on an error or difference between the model output and the target mappings.

As further illustrated in FIG. 4, output of the mapper machine learning model 404 may be used to generate a recommendation data object 408, which lists canonical data element types recommended for mapping with the external data element type and/or predicted to accurately map with the external data element type. The recommendation data object 408 may list and rank the canonical data element types according to a probability of each canonical data element type being accurately mapped with the external data element type.

Referring now to FIG. 5, a flowchart diagram is provided to illustrate an example process 500 for recommending and/or defining mappings from an external data element type to one or more canonical data element types on a multi-dimensional basis. In various embodiments, the system computing entity 106 comprises means, such as the processing elements 205, memory media 210, 215, network interface 220, and/or the like, for recommending and/or defining such cross-schema mappings and for performing steps/operations of process 500. In various embodiments, the client computing entity 102 also comprises means, such as processing elements 308, memories 322, 324, network interface 320, and/or the like, for recommending and/or defining such cross-schema mappings and for performing steps/operations of process 500.

Process 500 comprises step/operation 501, at which multi-dimensional representations 402 for a plurality of canonical data element types are obtained, the canonical data element types belonging to a canonical schema. Within the present disclosure, multi-dimensional representations for canonical data element types may be interchangeably referred to as canonical multi-dimensional representations, while multi-dimensional representations for external data element types for external data element types may be interchangeably referred to as external multi-dimensional representations.

In various embodiments, obtaining multi-dimensional representations 402 for canonical data element types comprises retrieving, receiving, accessing, and/or the like multi-dimensional representations 402 that may be stored in a database accessible by the system computing entity 106, in a client computing entity 102, in a storage subsystem 104, in memories 322, 324, and/or the like. For example, the multi-dimensional representations 402 may have been historically generated and stored. In some example embodiments, the multi-dimensional representations 402 are retrieved and updated periodically. Otherwise, obtaining multi-dimensional representations 402 for canonical data elements may comprise generating the multi-dimensional representations 402 for canonical data elements.

In various embodiments, a multi-dimensional representation 402 is a graph-based data structure comprising subgraph portions each capturing a dimension or aspect of a data element type. In various other example embodiments, a multi-dimensional representation 402 may be a data object (e.g., a vector) derived from a graph-based data structure that captures dimensions or aspects of a data element type. For instance, such a data object may encode each node of the graph-based data structure as well as neighboring information for each node. Other data structures may be additionally or alternatively implemented in order to efficiently characterize and capture a plurality of dimensions or aspects of a data element type. In various embodiments, the dimensions or aspects of a data element type captured by a multi-dimensional representation 402 include the schema-specific identifier of the data element type, the linguistic definition string of the data element type, the schema-agnostic identifier of the data element type, and/or a statistical profile data object of the data element type. That is, a multi-dimensional representation 402 may be generated to describe at least some or all of these four aspects.

Process 500 comprises step/operation 502, which includes identifying an external data element type that belongs to an external schema. In various embodiments, an external data element type may be identified based at least in part on a user selection of the external data element type via a GUI. For instance, an end-user may select a visual indication of one external data element type from a plurality of external data element types belonging to an external schema and visually indicated by the GUI, and this selection by the end-user may cause the one external data element type to be identifier and may further trigger cross-schema mappings for the one external data element type to be recommended and/or defined in accordance with various embodiments of the present disclosure. In various embodiments, identification of one external data element type provides the basis of cross-schema mapping recommendation and/or definition, as various embodiments are specifically directed to recommending and/or defining mappings from the one external data element type to various canonical data element types.

In various embodiments, cross-schema mappings may be recommended and/or defined for each of the plurality of external data element types of the external schema, and the system computing entity 106 may be configured to perform at least some steps/operations of process 500 for each external data element type. Therefore, at step/operation 502, the external data element type may be identified using a global identifier or iteration counter to enable iterative cross-schema mapping recommendation and/or definition through multiple external data element types of the external schema.

Process 500 comprises step/operation 503, which comprises generating a multi-dimensional representation 402 for the external data element type. In some alternative examples, a multi-dimensional representation 402 for the external data element type may have been previously generated (e.g., by an external system managing the external schema), and step/operation 503 may include retrieving, receiving, accessing, and/or the like the previously-generated multi-dimensional representation for the external data element type. In various embodiments, step/operation 502 and step/operation 503 may be performed prior and/or substantially concurrent with step/operation 501. For example, in some examples, the multi-dimensional representation 402 for the external data element type and the multi-dimensional representations 402 for the canonical data element types are generated in parallel.

As discussed, a multi-dimensional representation 402 is generated to describe or capture multiple dimensions or aspects of a data element type, and in various embodiments, these dimensions include a schema-specific identifier of the data element type, a linguistic definition string of the data element type, a schema-agnostic identifier of the data element type, and/or a statistical profile data object of the data element type. A multi-dimensional representation 402 and the dimensional representations thereof are generated based at least in part on identifying such metadata for the data element type from a schema registry database for the schema to which the data element type belongs. That is, generating a multi-dimensional representation 402 for the external data element type comprises accessing and processing a schema registry database for the external schema.

FIG. 6 illustrates an example portion of metadata stored in a schema registry database to describe one particular external data element type 600. As shown, the schema registry database may store and describe at least the schema-specific identifier 602, the linguistic definition string 604, and one or more schema-agnostic identifiers 606 for a data element type. In the illustrated embodiments, the schema-specific identifier 602 for the external data element type 600 is IndividualFirstName. It may appreciated that the schema-specific identifier 602 may be a name or a label for the external data element type 600, and as different schemas may be named by different entities, data element types that classify similar data with similar meaning may have different schema-specific identifiers. As shown in the illustrated embodiment, the schema-specific identifier 602 may be compliant with various standards or naming conventions and/or may be hierarchical or structured within itself. For instance, the schema-specific identifier 602 of IndividualFirstName first describes an object class of Individual meaning that the external data element type 600 may relate to an Individual object or entity and further describes a property term of First and a representation term of Name. Generally, a data element type is associated with one schema-specific identifier 602.

In generating the multi-dimensional representation 402 for the external data element type 600, the multi-dimensional representation 402 may be configured to comprise the character string of the schema-specific identifier 602 in its entirety and/or in each hierarchical or structured portion of the schema-specific identifier 602. In an example embodiments, a multi-dimensional representation 402 that is a graph-based data structure includes a subgraph portion corresponding to the schema-specific identifier aspect or dimension, and the subgraph portion may include a node comprising the schema-specific identifier in its entirety and/or nodes each comprising a hierarchical or structured portion of the schema-specific identifier.

FIG. 6 further illustrates the schema registry database including a linguistic definition string 604 for the external data element type 600. In various embodiments, the linguistic definition string 604 is manually and explicitly defined by an end-user, such as a data steward, custodian, or administrator responsible for the external schema. In some examples, a linguistic definition string 604 may not be defined for a data element type, and generation of a multi-dimensional representation 402 for the data element type may comprise querying an end-user for a linguistic definition string 604. In the illustrated embodiment, the linguistic definition string 604 for the external data element type 600 is An Individual's First Name or Given Name, which explains a meaning of the encoding or classification given by the external data element type 600.

In various embodiments, the linguistic definition string 604 for a data element type may be converted to embeddings or some numerical representation using natural language processing. In particular, features relating to the semantic meaning of each word of the linguistic definition string 604 and of the linguistic definition string 604 as a whole may be encoded into an NLP-based representation (e.g., embeddings). This NLP-based representation generated from the linguistic definition string 604 of a data element type may then be stored in at least one node of a subgraph portion during generation of a multi-dimensional representation 402 of the data element type.

As further illustrated in FIG. 6, a schema registry database may include schema-agnostic identifiers 606 for a data element type, generally; however, there may exist data element types without schema-agnostic identifiers 606. For example, as schema-agnostic identifiers 606 serve as references to existing data element types or resources describing data element types, it may be impossible to define a schema-agnostic identifier 606 for a data element type if no appropriate existing data elements types or resources exist. Some example data element types may be associated with more than one schema-agnostic identifiers 606. In various embodiments, schema-agnostic identifiers 606 include Universal Resource Identifiers (URI) or an otherwise similar text string. Similarly, generation of the multi-dimensional representation 402 of a data element type may comprise querying an end-user for any applicable schema-agnostic identifiers 606, and any responses by the end-user may be stored in nodes of a subgraph portion corresponding to a schema-agnostic identifier dimension. A multi-dimensional representation 402 may store the URI or similar text string in a node of a subgraph portion corresponding to the schema-agnostic identifier dimension. In some examples, NLP may be performed to determine a vector or numerical representation of the URI or similar text string, and such a representation is additionally or alternatively stored in a node of the multi-dimensional representation 402.

While not explicitly illustrated in FIG. 6, a statistical profile data object may be metadata that is similarly stored in a schema registry database. In some other examples, a statistical profile data object of a data element type may be generated using sample data elements that are classified, encoded, categorized, and/or the like by the data element type. FIG. 7 illustrates generation of an example statistical profile data object for a data element type.

For example, FIG. 7 illustrates sample data elements of Alex, Arun, Dan, John, Ravi, and Susan which are classified, encoded, categorized, and/or the like by the aforementioned external data element type 600 labelled IndividualFirstName, in the illustrated embodiment. Indeed, it may be understood (e.g., from the external data element type 600) that the sample data elements describes first names of different individuals. Using these six sample data elements, a statistical profile data object may be generated for the external data element type 600. For at least canonical data element types, a sample data object 702 may be configured to store, reference, or identify a population of data elements for a corresponding data element type, and thus, sample data elements may be identified using a sample data object 702 in order to generate a statistical profile data object 704 for the corresponding data element type. In some examples, the sample data object 702 may be a text file, a spreadsheet, structured data, an Extensible Markup Language (XML) document, and/or the like.

In the illustrated embodiment, the statistical profile data object 704 includes an inferred or predicted common data type of the sample data elements for the external data element type 600. In various embodiments, various data type inference tests may be performed in order to infer or predict a data type of each sample data element, and a common data type for a data element type can be predicted. For example, if at least a threshold number of sample data elements have a particular data type (e.g., string, boolean, char), then the common data type of the data element type may be the particular data type. Here, it may be understood by those of skill in the field of the present disclosure that the data types themselves (e.g., string, boolean, char) may also be considered as data element types specifically in applications in which mapping may be performed between data type schemas (e.g., the C programming language, the XML Schema 2 Built-In Type System).

The illustrated embodiment further shows the statistical profile data object 704 including an average length or size of the sample data elements. In particular, the statistical profile data object 704 of the illustrated embodiment describes an average character length of the sample data elements, which can be clearly seen or determined to be 7.4 characters. Similarly, the statistical profile data object 704 may include a standard deviation of the lengths or sizes of the sample data elements.

In various embodiments, the statistical profile data object 704 includes or describes a value distribution or pattern. This may be similarly embodied by a value or character range. Although not explicitly illustrated, the statistical profile data object 704 of the illustrated embodiment may indicate that the sample data elements include characters spanning from A to X, with A and N being frequently occurring characters. With respect to sample data elements that are numeric values, a distribution profile may be generated.

In general then, a statistical profile data object 704 for a data element type may include any combination of any of the above described statistical measures (e.g., common data type, average length or size, standard deviation of length or size, value distribution), as well as other statistical measures including minimum value, maximum value, percentage of zeros, NULLs, or NaNs. For generation of the multi-dimensional representation 402 of a data element type, each statistical measure may be described by at least one node of the subgraph portion corresponding to the statistical profile dimension or aspect. Thus, for example, a multi-dimensional representation 402 for a data element type having a statistical profile data object with a large number of statistical measures may include a relatively large number of nodes within a subgraph portion corresponding to the statistical profile dimension or aspect. In various embodiments, at least the dimensional representation (e.g., a subgraph portion) within a multi-dimensional representation 402 that corresponds to the statistical profile dimension may be periodically updated and the statistical measures may be re-determined after further sampling of data elements.

Returning to FIG. 5, process 500 comprises step/operation 504, which comprises determining a predicted similarity score for each canonical data element type using a mapper machine learning model 404 configured to compare multi-dimensional representations 402. In various example embodiments, a multi-dimensional representation 402 of the identified external data element type and a multi-dimensional representation 402 of a canonical data element type is provided to the mapper machine learning model 404 to determine a predicted similarity score for that pair of multi-dimensional representations 402. Multiple further pairs including the same multi-dimensional representation 402 of the identified external data element types and different multi-dimensional representations 402 of different canonical data element types may be provided to the mapper machine learning model 404 iteratively and/or sequentially in order to evaluate different potential mappings of the identified external data element type with different potential canonical data element types. In various embodiments, at least a subset of the plurality of canonical data element types of the canonical schema are evaluated with the identified external data element type, and the subset of canonical data element types may be a particular hierarchical domain of the canonical schema (e.g., canonical data element types belonging to the same object or entity class), in some examples. Pairs of the external data element type with different canonical data element types may be evaluated by the mapper machine learning model 404 individually or in batches with a configured size, and similarly, the mapper machine learning model 404 may be configured or trained with user-selected cross-schema mappings individually or on a batch-basis.

As previously discussed, the mapper machine learning model 404 may be configured with trainable dimensional weights that each control an impact of comparison of data element types along a certain dimension or aspect with the data element types being characterized in the certain dimension or aspect via the multi-dimensional representations 402. Thus, in various embodiments, the mapper machine learning model 404 may be configured to compare portions of multi-dimensional representations individually on a dimensional-basis and to weight comparison results according to the dimensional weights. Generally, the mapper machine learning model 404 may implement any suitable graph comparison techniques to compare sub-graph portions of multi-dimensional representations 402 that correspond to the same dimension or aspect. In some examples, sub-graph portions may be converted to vector or numerical representations for comparison using cosine similarity techniques.

In various embodiments, the dimension or aspect corresponding to the schema-agnostic identifiers may be compared first. A pair of the identified external data element type and a canonical data element type that has the same schema-agnostic identifier (e.g., each data element type references the same existing data element type or resource) may be automatically identified as a perfect match, and the predicted similarity score for the pair is automatically set to a maximum value, such as a mapping probability of 100% or 1.0. In such instances, other comparisons in other dimensions may be foregone, and the dimensional weights are not specifically used, as the predicted similarity score is automatically set to its maximum value.

Otherwise, comparisons of multi-dimensional representations 402 along individual dimensions continues, in various example embodiments, and dimensional weights are applied to comparison results. The mapper machine learning model 404 is configured to output a predicted similarity scores based at least in part on the aggregation of comparison results having the dimensional weights applied. The predicted similarity scores may represent a probability of an accurate mapping and therefore may span between zero and one, in some examples. A predicted similarity score determined for a pair of the identified external data element type and a canonical data element type may be associated with the canonical data element type.

Process 500 comprises step/operation 505, at which a recommendation data object is generated and automatically provided. The recommendation data object is generated to indicate one or more mappings between the external data element type and one or more canonical data element types, and the recommendation data object is generated using the predicted similarity scores. In various embodiments, generating the recommendation data object comprises comparison of predicted similarity scores with a configurable threshold in order to select one or more canonical data element types for recommendation.

FIG. 8 provides a diagram illustrating example predicted similarity scores associated with example canonical data element types 802, the predicted similarity scores being generated using a mapper machine learning model configured to compare multi-dimensional representations 402 of the canonical data element types 802 with a multi-dimensional representation 402 of the identified external data element type. In the illustrated embodiment, a predicted similarity score of 0.95 is determined and associated with the canonical data element type 802 labelled GivenName, a predicted similarity score of 0.5 is determined and associated with the canonical data element type 802 labelled LastName, and a predicted similarity score of 0.1 is determined and associated with the canonical data element type 802 labelled ZipCode. With the configuration of a threshold at 0.8, for example, the canonical data element type 802 labelled GivenName is recommended to be mapped with the external data element type labelled PersonFirstName. That is, a recommendation data object 408 may be generated to identify the canonical data element type 802 labelled GivenName based at least in part on the predicted similarity score satisfying the configurable threshold.

In various embodiments, the recommendation data object may be further provided and visually indicated via the GUI 900 to an end-user. FIG. 9 illustrates an example GUI 900 for visually indicating predicted cross-schema mappings. For example, for an external data element type of an external schema 902, the GUI 900 may be configured to visually connect the external data element type with recommended canonical data element types. In various embodiments, the GUI 900 may be so configured based at least in part on the recommendation data object being provided to a GUI rendering engine, which may cause the visual connections or mappings to be provided in real-time.

As previously described, the GUI 900 is configured to user interaction, and an end-user may define a user-selected cross-schema mapping using the GUI 900. For example, the end-user may select one of the recommended and visually indicated cross-schema mappings. In various embodiments, at least the mapper machine learning model 404 and dimensional weights thereof are re-configured or re-trained using such user-selected cross-schema mappings. For instance, the user-selected cross-schema mappings serve as a target response or target mapping against which the recommended cross-schema mappings are compared. An error or loss between the recommended cross-schema mappings and the user-selected cross-schema mappings is used to configured and re-configure parameters and weights of the mapper machine learning model 404.

In various embodiments, alternative to recommending one or more cross-schema mappings, a cross-schema mapping for the identified external data element type may be defined. For example, the canonical data element type having the highest predicted similarity score may be selected for defined mapping with the identified external data element type.

Subsequent to process 500, various automated actions may be performed. Upon defining at least a threshold number of cross-schema mappings, receiving at least a threshold number of user-selected cross-schema mappings, and/or the like, external data may be automatically received and integrated in accordance with the cross-schema mappings and the canonical schema. Additionally, with the defined or user-selected cross-schema mappings, external data received in the future can be integrated automatically.

Therefore, various embodiments enable improved and efficient cross-schema mapping and by extension, efficient data integration and communication between different, independent, and heterogenous systems. Various embodiments improve accuracy of predicted mappings between external data element types and canonical data element types and provide effective recommendations for external-and-canonical-schema mapping, thereby reducing the number of repeated operations by end-users to integrate heterogeneous data to provide various technical improvements and advantages. Specifically, various embodiments address technical challenges related to computational efficiency, operational reliability, operational throughput, and communication bandwidth of schema mapping systems and/or data integration systems. That is, various technical advantages provided in various embodiments described herein include decreased number of computational operations performing by schema mapping systems and/or data integration systems and increased operational throughput and capacity. Accordingly, various embodiments of the present disclosure make important technical contributions to the field of cross-schema mapping and/or data integration.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method comprising:
   receiving from an external system of a plurality of heterogenous systems, by one or more processors and for a storage subsystem associated with a canonical schema, an external data element of an external data element type that is associated with an external schema of the external system;
   receiving, by the one or more processors, a first graph-based data structure for a canonical data element type of the canonical schema, wherein the first graph-based data structure (i) comprises a plurality of first subgraphs respectively corresponding to a plurality of dimensions for an element type and (ii) is configured for input to a mapper machine learning model;
   generating, by the one or more processors, a second graph-based data structure for the external data element type, wherein the second graph-based data structure (i) comprises a plurality of second subgraphs respectively corresponding to the plurality of dimensions and (ii) is configured for input to the mapper machine learning model;
   providing, by the one or more processors, the first graph-based data structure and the second graph-based data structure to the mapper machine learning model that is trained with labeled target cross-schema mappings for a given external data element type, causing the mapper machine learning model to generate a predicted similarity score that is (1) representative of a similarity of the canonical data element type to the external data element type and (2) generated based at least in part on (i) a plurality of trainable dimensional weights of the mapper machine learning model that correspond to the plurality of dimensions and are determined based at least in part on an error or difference between an output of the mapper machine learning model and the labeled target cross-schema mappings, (ii) the plurality of first subgraphs respectively corresponding to the plurality of dimensions, and (iii) the plurality of second subgraphs respectively corresponding to the plurality of dimensions; and
   in response to the predicted similarity score satisfying a predetermined threshold, storing, by the one or more processors, at least a portion of the external data element within the storage subsystem by integrating the external data element type with the canonical schema.

2. The computer-implemented method of claim 1, wherein the plurality of dimensions comprises a dimension relating to a schema-specific identifier, the schema-specific identifier being a name or label of the element type.

3. The computer-implemented method of claim 1, wherein the plurality of dimensions comprises a dimension relating to a linguistic definition string defined by an end-user to linguistically explain a meaning of the element type.

4. The computer-implemented method of claim 1, wherein the plurality of dimensions comprises a dimension relating to a schema-agnostic identifier referencing a similar existing data element type of a different schema.

5. The computer-implemented method of claim 1, wherein the plurality of dimensions comprises a dimension relating to a statistical profile data object comprising a plurality of statistical measures determined based at least in part on analysis of a plurality of data elements associated with or classified by the element type.

6. The computer-implemented method of claim 5, wherein the plurality of statistical measures comprises (i) an average length, size, or value of the plurality of data elements and (ii) a standard deviation of lengths, sizes, or values of the plurality of data elements.

7. The computer-implemented method of claim 1, wherein the first graph-based data structure of a data element type is a graph-based data structure comprising a subgraph portion corresponding to one or more of (i) a first dimension of the canonical data element type relating to a schema-specific identifier of the canonical data element type, (ii) a second dimension of the canonical data element type relating to a linguistic definition string of the canonical data element type, (iii) a third dimension of the canonical data element type relating to a schema-agnostic identifier of the canonical data element type, and (iv) a fourth dimension of the canonical data element type relating to a statistical profile data object of the canonical data element type.

8. The computer-implemented method of claim 7, wherein the mapper machine learning model is configured to perform one or more graph comparison algorithms to determine a comparison result between the first graph-based data structure and the second graph-based data structure.

9. The computer-implemented method of claim 1, further comprising:
   identifying a plurality of canonical data element types of the canonical schema;
   generating, based at least in part on the predicted similarity score, a recommendation data object indicating one or more mappings between the external data element type and a selected subset of the plurality of canonical data element types;
   providing for display, via a graphical user interface, the one or more mappings of the recommendation data object;
   detecting a user selection of a particular mapping of the one or more mappings indicated by the recommendation data object; and
   reconfiguring the plurality of trainable dimensional weights of the mapper machine learning model based at least in part on the user selection.

10. The computer-implemented method of claim 9, wherein the graphical user interface is configured to:
    display (i) a plurality of external data element types belonging to the external schema, (ii) the plurality of canonical data element types belonging to the canonical schema, and (iii) the one or more mappings between the external data element type and the selected subset of the plurality of canonical data element types, and enable the user selection of the particular mapping of the one or more mappings between the external data element type and one of the selected subset of the plurality of canonical data element types.

11. The computer-implemented method of claim 9, wherein the external data element type is provided via an application programming interface (API) query and the recommendation data object is automatically provided via an API response to the API query.

12. The computer-implemented method of claim 9, wherein a respective predicted similarity score for each of the selected subset of the plurality of canonical data element types satisfies one or more similarity score thresholds.

13. The computer-implemented method of claim 1, wherein the first graph-based data structure comprises one or more canonical embeddings for the canonical data element type and the second graph-based data structure comprises one or more external embeddings for the external data element type.

14. The computer-implemented method of claim 9, wherein reconfiguring the plurality of trainable dimensional weights of the mapper machine learning model comprises re-training the mapper machine learning model based at least in part on a training entry that describes a user-selected cross-schema mapping for a respective comparison result between the first graph-based data structure and the second graph-based data structure.

15. A system comprising memory and one or more processors communicatively coupled to the memory, the one or more processors configured to:
receive, from an external system of a plurality of heterogenous systems and for a storage subsystem associated with a canonical schema, an external data element of an external data element type that is associated with an external schema of the external system;
receive a first graph-based data structure for a canonical data element type of the canonical schema, wherein the first graph-based data structure (i) comprises a plurality of first subgraphs respectively corresponding to a plurality of dimensions for an element type and (ii) is configured for input to a mapper machine learning model;
generate a second graph-based data structure for the external data element type, wherein the second graph-based data structure comprises (i) a plurality of second subgraphs respectively corresponding to the plurality of dimensions and (ii) is configured for input to the mapper machine learning model;
provide the first graph-based data structure and the second graph-based data structure to the mapper machine learning model that is trained with labeled target cross-schema mappings for a given external data element type, causing the mapper machine learning model to generate a predicted similarity score that is (1) representative of a similarity of the canonical data element type to the external data element type and (2) generated based at least in part on (i) a plurality of trainable dimensional weights of the mapper machine learning model that correspond to the plurality of dimensions and are determined based at least in part on an error or difference between an output of the mapper machine learning model and the labeled target cross-schema mappings, (ii) the plurality of first subgraphs respectively corresponding to the plurality of dimensions, and (iii) the plurality of second subgraphs respectively corresponding to the plurality of dimensions; and
in response to the predicted similarity score satisfying a predetermined threshold, store at least a portion of the external data element within the storage subsystem by integrating the external data element type with the canonical schema.

16. The system of claim 15, wherein the plurality of dimensions comprises a dimension relating to a schema-specific identifier, the schema-specific identifier being a name or label of the element type.

17. The system of claim 16, wherein the plurality of dimensions comprises a dimension relating to a linguistic definition string defined by an end-user to linguistically explain a meaning of the element type.

18. The system of claim 15, wherein the plurality of dimensions comprises a dimension relating to a schema-agnostic identifier referencing a similar existing data element type of a different schema.

19. The system of claim 15, wherein the plurality of dimensions comprises a dimension relating to a statistical profile data object comprising a plurality of statistical measures determined based at least in part on analysis of a plurality of data elements associated with or classified by the element type.

20. One or more non-transitory computer-readable storage media including instructions that, when executed by one or more processors, cause the one or more processors to:
receive, from an external system of a plurality of heterogenous systems and for a storage subsystem associated with a canonical schema, an external data element of an external data element type that is associated with an external schema of the external system;
receive a first graph-based data structure for a canonical data element type of the canonical schema, wherein the first graph-based data structure (i) comprises a plurality of first subgraphs respectively corresponding to a plurality of dimensions for an element type and (ii) is configured for input to a mapper machine learning model;
generate a second graph-based data structure for the external data element type, wherein the second graph-based data structure (i) comprises a plurality of second subgraphs respectively corresponding to the plurality of dimensions and (ii) is configured for input to the mapper machine learning model;
provide the first graph-based data structure and the second graph-based data structure to the mapper machine learning model that is trained with labeled target cross-schema mappings for a given external data element type, causing the mapper machine learning model to generate a predicted similarity score that is (1) representative of a similarity of the canonical data element type to the external data element type and (2) generated based at least in part on (i) a plurality of trainable dimensional weights of the mapper machine learning model that correspond to the plurality of dimensions and are determined based at least in part on an error or difference between an output of the mapper machine learning model and the labeled target cross-schema mappings, (ii) the plurality of first subgraphs respectively corresponding to the plurality of dimensions, and (iii) the plurality of second subgraphs respectively corresponding to the plurality of dimensions; and
in response to the predicted similarity score satisfying a predetermined threshold, store at least a portion of the external data element within the storage subsystem by integrating the external data element type with the canonical schema.

\* \* \* \* \*